(No Model.)
J. W. DEAR.
CORN PLANTER.
No. 337,485. Patented Mar. 9, 1886.
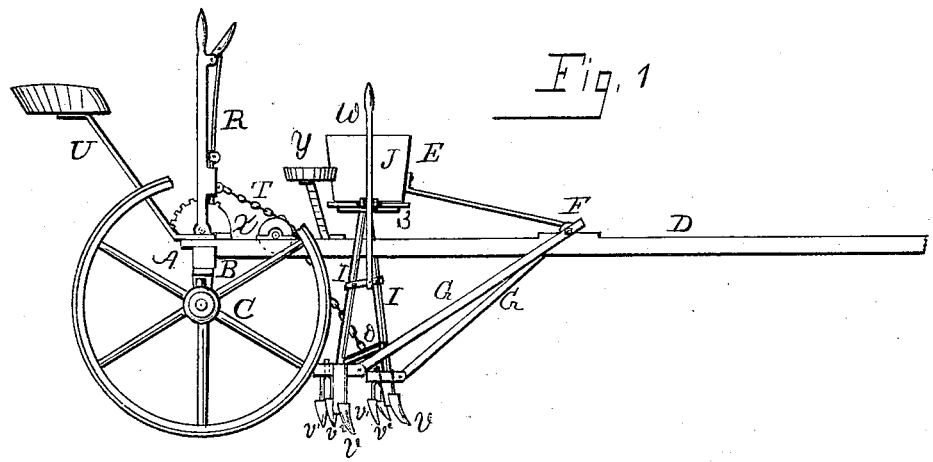
Fig. 1
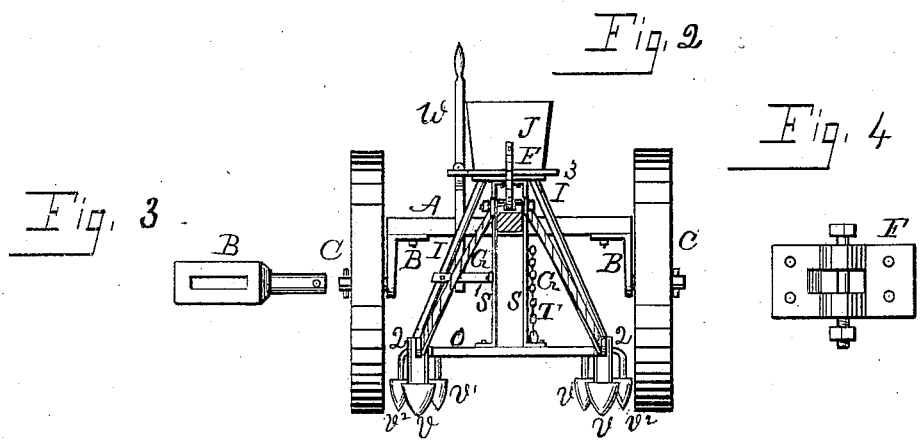
Fig. 2
Fig. 3
Fig. 4
WITNESSES:
Louis S. Reibold
Leopold Leibold
INVENTOR
James W. Dear
BY B. Rehering
His ATTORNEY

UNITED STATES PATENT OFFICE.

JAMES W. DEAR, OF DAYTON, OHIO.

CORN-PLANTER.

SPECIFICATION forming part of Letters Patent No. 337,485, dated March 9, 1886.

Application filed October 19, 1885. Serial No. 180,274. (No model.)

*To all whom it may concern:*

Be it known that I, JAMES W. DEAR, a citizen of the United States, residing at Dayton, in the county of Montgomery and State of Ohio, have invented a certain new and useful Improvement in Corn-Planters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in corn-planters in which the seed-box is held rigidly to the hoes, the same being attached by iron pipes, which convey the seed to the soil. These parts are pivoted to the tongue by suitable mechanism, and other essential parts are attached to the other parts of the vehicle.

The objects are to drop two rows from a single seed-box, and so attach the same to a vehicle that the same may be readily detached, and that said vehicle may be used for a cultivator or hay-rake. I attain these objects by the mechanism illustrated in the accompanying drawings, in which—

Figure 1 is a fragmentary side view of the corn-planter. Fig. 2 is a front view of the same. Fig. 3 is a top view of the spindle. Fig. 4 is a top view of the coupling-plate.

Similar letters designate like parts throughout the several views.

In the drawings, Fig. 1, parts are omitted to add clearness to the illustration.

A is a wooden axle, with the tongue D attached to the center, and may be secured by suitable stays.

B is a cast-iron spindle, which is shown detached at Fig. 3. It consists of a slotted bearing-plate, a downward projection, and the bearing for the wheel-box. The object of the said slot is for the purpose of adjustment. As the sides of the slots form the bearing for the bolt-nuts—said bolts passing through the axle—a lateral adjustment is readily made. By this adjustment the wheels may be made to pass directly over the hills of corn or outside thereof.

C C are the ground-wheels, having a broad face.

On the tongue D are mounted two seats—the rear one, U, for the driver, and the forward one, Y, for the boy who operates the dropper.

Attached to the axle, to the left of the seat, is a lever for raising and lowering the hoes. This lever is connected by the chain T to the cross-bar O, which connects the hoes on the opposite sides. The chain T passes over the grooved pulley X. When the lever is drawn backward, the hoes are raised from the soil, and a catch of the device engages the rack, so that they are held suspended to be again lowered by releasing said catch.

J is the feed-box, the operative mechanism of which presents no new feature, and therefore is not illustrated. The feeding-disk is made to revolve by means of the lever W, and the only change is that the base-plate 3 has two orifices, into which are screwed the pipes I I, for the purpose of conveying the grain to the soil through an orifice in the frame to which the forward hoes, V, are bolted. The lower end of the lever is pivoted to the bar 1, which is attached to the pipe I and bar S, and at its center it is pivoted to the frame, which carries the pawls that operate the perforated plate that carries the seed to the orifices through which it drops out.

To the base-plate of the seed-box and to the bar O are bolted the bars S S, which straddle the tongue and serve as a guide to the hoes. The series of hoes on both sides are alike, and the description of one series will suffice. To the frame or stock Q is bolted the furrowing-hoe V, and in a projection to the rear are held the covering-hoes V' V². To a forward projection of the same are attached the drag-bars G G. These bars, with the bar or stay E, attached to the feed-box, are held by a bolt in the plate F, which is bolted to the tongue.

Having fully described my invention, what I claim, and desire to secure by Letters Patent, is—

1. In a corn-planter, the combination of the seed-box rigidly attached to the hoe-frames by conveyer-pipes, said hoe-frames carrying each a series of hoes, and said frames being connected by a cross-bar, the said hoe-frames and seed-box being pivoted by drag-bars and stay to the tongue of a vehicle, substantially as set forth.

2. In a corn-planter, the combination of the seed-box rigidly attached to the hoe-frames by conveyer-pipes, said hoe-frames carrying each a series of hoes, and said frames being connected by a cross-bar, and guide-bars astride of the tongue and attached to the cross-bar and the bottom of the seed-box, the said hoe-frames and seed-box being pivoted by drag-bars and stay to the tongue of a vehicle, substantially as set forth.

3. The raising device mounted as herein described, in combination with the rigid frame composed of the seed-box with base-plate 3, pipes I I, cross-bars O, arms S S, drag-bars G G, stay E, and plate F, with bolt and tongue, substantially as set forth.

In testimony that I claim the foregoing as my own I affix my signature in presence of two witnesses.

JAMES W. DEAR.

Witnesses:
B. PICKERING,
S. RUFUS JONES.